(12) United States Patent
Zhang et al.

(10) Patent No.: US 10,987,846 B2
(45) Date of Patent: Apr. 27, 2021

(54) THIN FILM COMPOSITE HOLLOW FIBER MEMBRANES FOR OSMOTIC POWER GENERATION

(71) Applicant: National University of Singapore, Singapore (SG)

(72) Inventors: Sui Zhang, Singapore (SG); Panu Sukitpaneenit, Singapore (SG); Tai-Shung Chung, Singapore (SG); Chunfeng Wan, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 16/298,861

(22) Filed: Mar. 11, 2019

(65) Prior Publication Data

US 2019/0202103 A1    Jul. 4, 2019

Related U.S. Application Data

(63) Continuation of application No. 14/894,837, filed as application No. PCT/SG2014/000286 on Jun. 17, 2014, now abandoned.

(60) Provisional application No. 61/836,697, filed on Jun. 19, 2013.

(51) Int. Cl.

| | | |
|---|---|---|
| *B01D 69/08* | (2006.01) | |
| *B01D 71/68* | (2006.01) | |
| *B01D 67/00* | (2006.01) | |
| *B01D 69/02* | (2006.01) | |
| *B01D 69/10* | (2006.01) | |
| *B01D 69/12* | (2006.01) | |
| *B01D 71/56* | (2006.01) | |
| *B01D 61/00* | (2006.01) | |
| *B29C 48/09* | (2019.01) | |
| *B29C 48/00* | (2019.01) | |
| *B29K 81/00* | (2006.01) | |
| *B29L 23/00* | (2006.01) | |
| *B29L 31/00* | (2006.01) | |

(52) U.S. Cl.
CPC .......... *B29C 48/09* (2019.02); *B01D 67/0006* (2013.01); *B01D 67/0009* (2013.01); *B01D 69/02* (2013.01); *B01D 69/08* (2013.01); *B01D 69/087* (2013.01); *B01D 69/088* (2013.01); *B01D 69/10* (2013.01); *B01D 69/125* (2013.01); *B01D 71/56* (2013.01); *B01D 71/68* (2013.01); *B29C 48/022* (2019.02); *B01D 61/002* (2013.01); *B01D 2323/40* (2013.01); *B01D 2325/04* (2013.01); *B01D 2325/20* (2013.01); *B01D 2325/24* (2013.01); *B29K 2081/06* (2013.01); *B29L 2023/00* (2013.01); *B29L 2031/731* (2013.01)

(58) Field of Classification Search
None
See application file for complete search history.

(56) References Cited

U.S. PATENT DOCUMENTS

| | | |
|---|---|---|
| 4,772,391 A | 9/1988 | Baker et al. |
| 4,826,599 A | 5/1989 | Bikson et al. |
| 2004/0149127 A1 | 8/2004 | Lyons et al. |
| 2004/0167237 A1 | 8/2004 | Kim et al. |
| 2007/0199892 A1 | 8/2007 | Peinemann et al. |
| 2010/0224553 A1 | 9/2010 | Ansorge et al. |
| 2011/0192281 A1 | 8/2011 | Hosseini et al. |
| 2012/0080378 A1 | 4/2012 | Revanur et al. |
| 2012/0318729 A1 | 12/2012 | Yip et al. |

FOREIGN PATENT DOCUMENTS

| | | |
|---|---|---|
| EP | 0927572 A2 | 7/1999 |
| WO | WO-2003/097221 A1 | 11/2003 |
| WO | WO-2004/056459 A1 | 7/2004 |
| WO | WO-2007/007051 A1 | 1/2007 |
| WO | WO-2007/052042 A2 | 5/2007 |
| WO | WO-2012/146629 A1 | 11/2012 |
| WO | WO-2012/149141 A1 | 11/2012 |

OTHER PUBLICATIONS

Chou et al., Thin-film composite hollow fiber membranes for pressure retarded osmosis (PRO) process with high power density, 389 J. Membrane Sci. 25, 25-33 (2012). (Year: 2012).*
Wang et al., Characterization of novel forward osmosis hollow fiber membranes, 355 J. Membrane Sci., 158, 162 (2010). (Year: 2010).*
Sukitpaneenit et al "Supporting Information—High Performance Thin-Film Composite Forward Osmosis Hollow Fiber Membranes with Macrovoid-Free and Highly Porous Structure for Sustainable Water Production" Environmental Science and Technology vol. 46, pp. 7358-7365, 2012.

* cited by examiner

*Primary Examiner* — Krishnan S Menon
*Assistant Examiner* — Brad Gordon
(74) *Attorney, Agent, or Firm* — Cesari & McKenna, LLP

(57) ABSTRACT

Disclosed is a thin film composite hollow fiber that includes an outer support layer having a thickness of 10 to 1000 μm and a polyamide thin film layer having a thickness of 1 to 10000 nm; and has a transmembrane pressure resistance rate of higher than 15 bar and a pure water permeability rate of higher than $0.8\ \text{Lm}^{-2}\text{h}^{-1}\text{bar}^{-1}$. Also disclosed are methods of preparing the above-described support and composite hollow fiber.

5 Claims, No Drawings

THIN FILM COMPOSITE HOLLOW FIBER MEMBRANES FOR OSMOTIC POWER GENERATION

CROSS REFERENCE TO RELATED APPLICATIONS

This application is a continuation of co-pending U.S. patent application Ser. No. 14/894,837, filed on Nov. 30, 2015, which is the National Stage of International Application No. PCT/SG2014/000286, filed on Jun. 17, 2014, which claims the benefit of U.S. Provisional Application No. 61/836,697, filed on Jun. 19, 2013. The contents of all prior applications are hereby incorporated by reference in their entirety.

BACKGROUND OF THE INVENTION

Pressure retarded osmosis (PRO) is a membrane-based separation process for harvesting osmotic power, a renewable marine resource.

In a typical PRO process, two solutions of different salinities, i.e., river water and seawater, are separated by a semi-permeable membrane. Osmotic power is generated as a result of a trans-membrane pressure, output of which is used to drive a pressurized stream to a hydro-turbine to generate electricity.

An ideal semi-permeable membrane used in a PRO process has both a high mechanical strength (i.e., capable of withstanding a high transmembrane pressure) and a high pure water permeability (PWP) rate. Yet, a higher mechanical strength typically requires a higher density or a greater thickness of the membrane, which adversely affects the PWP rate.

There is a need to develop a high-performance PRO membrane for use in exploiting osmotic power.

SUMMARY OF THE INVENTION

This invention relates to a thin film composite (TFC) hollow fiber that can withstand an unexpectedly high pressure while maintaining a high water permeability rate. As such, it is suitable as a PRO membrane for use in developing osmotic energy.

One aspect of this invention relates to a TFC hollow fiber that includes an outer support layer and an inner thin film layer adherent to the outer support layer. The outer support layer or the support has a thickness of 10 to 10000 µm (preferably, 50-1000 µm, and, more preferably, 100-300 µm) and the inner thin film layer has a thickness of 1 to 10000 nm (preferably, 20-1000 nm, and, more preferably, 50-500 nm).

The outer support layer of a TFC hollow fiber can be made of polyethersulfone (PES), polysulfone, polyphenylsulfone, polyacrylonitrile, polyimide, polyether imide, polyamide-imide, polyvinylidene fluoride, cellulose triacetate, polyetherketone, or polyetheretherketone.

In one embodiment, the outer support layer is made of PES.

The inner thin film layer of a TFC hollow fiber, on the other hand, can be made of cross-linked polyamide.

The TFC hollow fiber of this invention exhibits a transmembrane pressure resistance rate of higher than 15 bar and a pure water permeability (PWP) rate of higher than 0.8 $Lm^{-2}h^{-1}bar^{-1}$. Preferably, the TFC hollow fiber has a transmembrane pressure resistance rate of higher than 20 bar and a PWP rate of higher than 3.3 $Lm^{-2}h^{-1}bar^{-1}$.

Another aspect of this invention relates to a method of preparing the above-described support of a TFC hollow fiber. The method includes the following steps: (i) dissolving a polymer in a solvent containing N-methyl-2-pyrrolidone (NMP), polyethylene glycol (PEG), and water to obtain a spinning dope, (ii) providing a triple orifice spinneret that has an external orifice, a middle orifice, and an internal orifice, and (iii) extruding the spinning dope through the middle orifice into a coagulation bath and at the same time passing a first solvent and a second solvent through the external orifice and the internal orifice, respectively. The polymeric hollow fiber support thus formed has a lumen.

Examples of the polymer used for this support are enumerated above. In the spinning dope, the polymer is 5 to 50 wt % (preferably, 10-40 wt %, and, more preferably, 15-30 wt %), the NMP is 5 to 95 wt % (preferably, 20-90 wt %, and, more preferably, 30-70 wt %), the PEG is 0 to 60 wt % (preferably, 0-40 wt %, and, more preferably, 10-40 wt %), and the water is 0 to 60 wt % (preferably, 0-40 wt %, and, more preferably, 10-40 wt %).

The first solvent and the second solvent, independently, can be NMP, water, alcohols, dimethylformamide, dimethyl sulfoxide, dimethylacetamide, or a combination thereof. Preferably, the first solvent is NMP and the second solvent is water.

The above-described method can include a step of coating the inner surface, i.e., the luminal surface, of the support with a thin film layer made of cross-linked polyamide to form a TFC hollow fiber. More specifically, a polyamide thin film layer is formed on the inner surface via interfacial polymerization between a first monomer solution and a second monomer solution. The TFC hollow fiber thus prepared has an outer support layer and an inner polyamide thin film layer.

Examples of the first monomer solution include a solution containing m-phenylenediamine (MPD), p-phenylenediamine, p-xylylenediamine, or branched or dendrimeric polyethylenimine. A specific example is an aqueous or alcohol solution or a water-alcohol solution containing MPD 0.1 to 20 wt % (preferably, 0.1-5 wt %, and, more preferably, 1-3 wt %). The second monomer solution can be a solution containing trimesoyl chloride (TMC), benzene-1,3-dicarbonyl chloride or benzene-1,4-dicarbonyl chloride. A specific example is a hexane or heptane solution containing TMC 0.01 to 1 wt % (preferably, 0.05-0.5 wt %, and, more preferably, 0.05-0.2 wt %).

The details of the invention are set forth in the description below. Other features, objects, and advantages of the invention will be apparent from the description and from the claims.

DETAILED DESCRIPTION

Within this invention is a TFC hollow fiber that includes an outer support layer and an inner thin film layer. The TFC hollow fiber has a transmembrane pressure resistance rate of higher than 15 bar and a PWP rate of higher than 0.8 $Lm^{-2}h^{-1}bar^{-1}$.

The transmembrane pressure resistance rate, i.e., the burst pressure rate, is measured in a lab-scale PRO process, in which deionized (DI) water, acting as a teed solution, and seawater (1M NaCl), acting as a draw solution, are separated by a PRO membrane, i.e., a TFC hollow fiber. Due to the salinity gradient across the membrane, water permeation is observed from the feed solution side to the draw solution side. A gradually increasing hydraulic pressure is applied at the draw solution until at one certain hydraulic pressure the direction of water permeation is to reversed. This hydraulic pressure is recorded as the transmembrane pressure resistance rate.

The PWP rate is determined in a lab-scale reverse osmosis (RO) process. More specifically, DI water is pumped into the lumen side of a hollow fiber at the flow rate of 0.15 ml/min and pressurized at 2 bar for 20 min before the permeate was collected from the shell side of the hollow fiber. The PWP rate, i.e., is calculated using the following equation:

$$A = \frac{Q}{A_m \Delta P},$$

wherein Q is the water permeation volumetric flow rate (L/h), $A_m$ is the effective filtration area (m$^2$), and $\Delta P$ is the transmembrane pressure (bar). The PWP rate is repeatedly tested until a stable reading is obtained when the transmembrane pressure is at 2 bar. Then the pressure is gradually increased by an interval of 3 bar below 14 bar and after that 1 bar per increase. At each pressure, the PWP rate is determined until its reading is stabilized.

The hollow fiber typically has a salt permeability rate of lower than 0.5 Lm$^{-2}$h$^{-1}$ and a NaCl rejection rate of higher than 88%. In addition, it typically has a power density rate of higher than 8 Wm$^{-2}$. Preferably, it has a power density rate of higher than 20 Wm$^{-2}$.

The salt permeability rate and the NaCl rejection rate are measured in a RO process similar to the PWP rate.

On the other hand, the power density rate (W) is measured in a PRO process similar to the transmembrane pressure. It is a product of the water flux ($J_w$) and the hydraulic pressure ($\Delta P$) applied at the draw solution:

$$W = J_w \Delta p,$$

wherein the water flux ($J_w$) is determined by monitoring the weight changes of the feed solution.

Described below is an exemplary procedure for preparing a TFC hollow fiber of this invention.

A triple orifice spinneret is used to prepare the support of the hollow fiber. First, a spinning dope is prepared by dissolving a polymer in a solution containing NMP and, optionally, PEG and water. NMP is a solvent for the polymer. PEG is commonly employed as a weak non-solvent additive to improve pore connectivity and enhance pore formation. Water is added in a relatively small amount to increase the dope viscosity and lead the polymer solution close to a binodal decomposition, resulting in sponge-like structure. The spinning dope is extruded through the middle orifice of the spinneret into a coagulation bath while the NMP and the water are passed through the external orifice and the internal orifice, respectively. The polymer in the spinning dope coagulates to form a polymeric support. More specifically, a relatively dense layer, i.e., an inner skin, is formed near the inner surface of the support as a result of co-extruding with water from the internal orifice, and a more porous outer surface of the support is formed as a result of co-extruding with NMP from the external orifice.

The polymeric support thus prepared has a lumen. The inner surface, i.e., the luminal surface, of the support is then coated with a thin film layer formed of cross-linked polyamide. Below is an example of how such a thin film layer is coated via interfacial polymerization between MPD and TMC.

First, a tube having a proximal end, a distal end, and a lumen diameter the same as that of the support is prepared, the distal end of which is reversibly connected to one end of the support. Next, an MPD aqueous solution is pumped from the proximal end of the tube to the support to coat the inner surface of the support, followed by blowing air from the proximal end of the tube to the support to remove excess MPD aqueous solution. Finally, a TMC hexane solution is pumped from the proximal end of the tube to the support to coat the MPD aqueous solution. As a result, a polyimide thin film layer is formed via interfacial polymerization between MPD and TMC on the inner surface of the support.

A TFC hollow fiber having an outer support layer and an inner polyamide thin film layer is thus formed.

In addition to its use for producing osmotic power in a PRO process, the TFC hollow fiber of this invention can also be employed in low pressure RO and forward osmosis processes.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are incorporated by reference in their entirety.

Example 1: Preparation of Hollow Fiber PES Supports

Three hollow fiber supports made of PES, designated as L, MM, and N, were prepared using a triple orifice spinneret as described below.

A spinning dope containing PES, NMP and, optionally, PEG and water, was first prepared. Listed in Table 1 below are the detailed spinning conditions for preparing these three supports and the parameters of the triple orifice spinneret. Supports L, MM, and N were prepared from different spinning dopes, each of which was made using PES of the same wt %, water of increasing wt % (0.0 to 6.4 wt %), and both PEG and NMP of decreasing wt %. See Table 1, row 3 "Spinning dope composition." Each of the supports was prepared by extruding NMP through the external orifice of the spinneret to promote high porosity at the outer surface of the support, extruding the spinning dope through the middle orifice, and extruding water, an internal coagulant, through the internal orifice to promote formation of an inner skin at the inner surface of the support. The NMP, spinning dope, and water were extruded at a free-fall speed through an air gap before entering a coagulation bath where water acted as an external coagulant. The hollow fiber PES support thus formed included a lumen.

TABLE 1

Spinning conditions for preparing hollow fiber PES supports

| Hollow Fiber Support | L | MM | N |
|---|---|---|---|
| Solvent through the external orifice | NMP | NMP | NMP |
| Spinning dope composition (PES/PEG/NMP/water, wt %) | 20.4/39.8/39.8/0.0 | 20.4/37.7/37.7/4.2 | 20.4/36.6/36.6/6.4 |
| Solvent through the internal orifice | Water | Water | Water |
| NMP flow rate (ml/min) | 0.1 | 0.1 | 0.1 |
| Spinning dope flow rate (ml/min) | 1.5 | 1.8 | 1.5 |
| Water flow rate (ml/min) | 1.0 | 1.0 | 1.0 |
| Air gap length | 1.0 | 1.0 | 1.0 |

TABLE 1-continued

Spinning conditions for preparing hollow fiber PES supports

| Hollow Fiber Support | L | MM | N |
|---|---|---|---|
| (cm) | | | |
| Speed (m/min) | Free fall, 2.4 | Free fall, 2.7 | Free fall, 2.2 |
| External coagulant | Water | Water | Water |
| Spinneret, orifice diameter (OD) (mm) | Triple orifice spinneret, external OD = 1.6 mm, middle OD = 1.3 mm, internal OD = 1.14 mm. | | |

Example 2: Characterization of the Hollow Fiber PES Supports

Field emission scanning electron microscopy (FESEM) images of support showed diverse morphologies of hollow fiber PES supports L, MM, and N prepared in Example 1. Namely, the cross sections of L, MM, and N all changed from a fully macrovoid structure to a sponge-like structure.

A study was conducted to characterize L, MM, and N and the results are summarized in Table 2 below.

TABLE 2

Characteristics of the hollow fiber PES supports

| Hollow Fiber PES Supports | L | MM | N |
|---|---|---|---|
| Mean pore diameter (nm) | 9.32 | 8.7 | 12.25 |
| Geometric standard variation, σ | 1.18 | 1.21 | 1.28 |
| MWCO | 34,917 | 31,672 | 84,630 |
| Porosity | 75.0 ± 0.1 | 75.3 ± 0.1 | 74.7 ± 0.1 |
| Maximum tensile stress (Mpa) | 4.57 ± 0.24 | 4.69 ± 0.55 | 5.33 ± 0.19 |
| Young's modulus (Mpa) | 200.44 ± 27.26 | 212.6 ± 15.23 | 251.28 ± 4.81 |
| Extension (%) | 46.45 ± 3.87 | 49.70 ± 5.21 | 70.75 ± 4.02 |
| Burst pressure (bar) | 17.8 | 22.0 | 21.0 |
| Estimated burst pressure (bar) | 19.0 | 19.9 | 23.9 |

The pore size and pore size distribution of a PES support were measured by a solute transport study, in which rejection by the PES support against polyethylene glycol (PEG) and polyethylene oxide (PEO) polymers of different molecular weights was tested under a transmembrane hydraulic pressure of 1.0 bar.

Note that the pore size and pore size distribution were quantified as the mean pore diameter and the geometric standard deviation, respectively. The mean pore diameter $\mu_p$ was determined at R=50%, R being the solute rejection rate. Further, the geometric standard deviation σ was determined as the ratio between $d_s$ at R=84.13% and $d_s$ at R=50%, $d_s$ being the solute diameter. $d_s$ is related to the molecular weight M of the polymer as described in the following equations:

For PEG: $d_s = 33.46 \times 10^{-12} \times M^{0.557}$

For PEO: $d_s = 20.88 \times 10^{-12} \times M^{0.587}$

When the solute rejection R was plotted against $d_s$ on a log-normal probability formula, a straight line could be drawn, indicating a linear relationship.

The molecular weight cut-off (MWCO) is defined as the solute molecular weight at R=90%.

Turning to the porosity, it was studied on a wet PES support taken out from the water bath and cut into pieces of 5 cm in length (l). These pieces were freeze-dried overnight before their weights (m) were measured. The overall porosity P (%) was calculated using the following equation:

$$P = \frac{\frac{3}{4}\pi l \rho_p (OD - ID)^2 - m}{\frac{3}{4}\pi l \rho_p (OD - ID)^2} \times 100,$$

wherein OD and ID were the outer diameter and inner diameter of a support, respectively. $\rho_p$ was the polymer density (1.37 g/cm$^2$). As pointed out above, l and m were the length and weight of the PES support piece, respectively.

The mechanical properties of the PES support including maximum tensile strength, Young's modulus, and extension, i.e., elongation at break, were measured by an Instron tensiometer (Model 5542, Instron Corp.). A constant elongation rate of 10 mm/min with a starting gauge length of 50 mm was applied.

The mean pore diameters of the PES supports decreased from L to MM and then increased from MM to N. See Table 2, row 2. Notably, the pore size distributions quantified as the geometric standard deviation σ for all supports were low (less than 1.5), indicating uniform distribution of pores in the supports. See Table 2, row 3. Support MM showed the highest porosity, whereas support N, which had the sponge-like structure, showed the lowest porosity among all three supports.

Example 3: Preparation of TFC Hollow Fibers

A polyamide thin film layer was coated on each of the inner surfaces of PES supports L, MM, and N via the interfacial polymerization reaction between MPD and TMC. The coating was conducted as follows.

First, a tube, which had a proximal end, a distal end, and a lumen diameter the same as that of the support, was reversibly connected, at its distal end, to one end of the support. Next, an aqueous solution containing MPD 2 wt % was pumped for 3 min from the proximal end of the tube to the support to coat the inner surface of the support, followed by blowing air for 5 min from the proximal end of the tube to the support to remove excess aqueous solution. Finally, a hexane solution containing TMC 0.1 wt % was pumped from the proximal end of the tube to the support to coat the aqueous solution, thereby forming a polyamide thin film layer via interfacial polymerization between MPD and TMC on the inner surface of the support.

The TFC hollow fibers thus formed, designated as L', MM', and N', were purged with air for 30 sec to remove any residual hexane solution and stored in DI water before further characterization.

Example 4: Characterization of the TFC Hollow Fibers

The FESEM images showed that the inner surfaces of hollow fibers L', MM', and N' prepared in Example 3 were much flatter than the typical "ridge-and-valley" morphology.

The PWP, NaCl rejection, and salt permeability rates of these hollow fibers were measured and the results are listed in Table 3 below.

TABLE 3

The PWP, NaCl rejection, and salt permeability
(B) rates of the TFC hollow fibers

| TFC Hollow Fiber | PWP ($Lm^{-2}h^{-1}bar^{-1}$) | NaCl rejection (%) | B ($Lm^{-2}h^{-1}bar^{-1}$) |
|---|---|---|---|
| L' | 1.4 ± 0.1 | 97.8 ± 0.1 | 0.12 |
| MM' | 3.3 ± 0.2 | 97.6 ± 0.1 | 0.31 |
| N' | 0.9 ± 0.1 | 89.7 ± 0.3 | 0.40 |

All of the hollow fibers had a PWP rate of higher than 0.8 $Lm^{-2}h^{-1}bar^{-1}$. Unexpectedly, hollow fiber MM had a PWP rate of higher than 3.3 $Lm^{-2}h^{-1}bar^{-1}$. In addition, all of the hollow fibers had a salt permeability rate of lower than 0.5 $Lm^{-2}h^{-1}$. Of note, hollow fiber N had a lower PWP rate and a higher salt permeability rate than L' and MM', which might account for a lower power density in a PRO test described below.

The PRO performances of hollow fibers L', MM', and N' were evaluated in a lab-scale PRO process and the results are shown in Table 4 below.

TABLE 4

PRO Performances of the TFC hollow fibers

| TFC Membrane | Configuration | Transmembrane pressure (bar) | Draw solution (NaCl) | $W_{max}$ (W/m$^2$) feed = 10 mM NaCl | $W_{max}$ (W/m$^2$) feed = 40 mM NaCl | Reference |
|---|---|---|---|---|---|---|
| L' | Hollow fiber | 17.5 | 1.0M | 12.2 | 9.7 | This work |
| MM' | Hollow fiber | >20.0 | 1.0M | 24.0 | 19.2 | This work |
| N' | Hollow fiber | 20.0 | 1.0M | 8.1 | 6.5 | This work |
| PES_TFC | Hollow fiber | 9.5 | 1.0M | 11.0 | 10.6 | [1] |
| HTI | Flat sheet | Tested up to 9.6 bar | 1.03M | 5.06 (DI water) | — | [2] |
| TFC_PAN | Flat sheet | 12 | 3.5 wt % | 2.7 (DI water) | — | [3] |
| TFC_P84 | Flat sheet | Tested up to 11 bar | 3.5 wt % | 2.8 (DI water) | — | [4] |
| TFC_Matrimid | Flat sheet | Tested up to 15 bar | 1.0M | 10.0 | 9.0 | [5] |
| TFC_nanofiber | Flat sheet | Tested up to 15.2 bar | 1.06M | 15.2 (0.9 mM) | 11.4 (80 m) | [6] |

References listed in Table 4:
[1] W.R. Thelin, E. Sivertsen, T. Holt, G. Brekke, Natural organic matter fouling in pressure retarded osmosis, J. Membr. Sci. 438 (2013) 46-56.
[2] A. Achilli, T.Y. Cath, A.E. Childress, Power generation with pressure retarded osmosis: an experimental and theoretical investigation, J. Membr. Sci. 343 (2009) 42.
[3] S. Chou, R. Wang, L. Shi, Q. She, C.Y. Tang, A.G. Fane, Thin-film composite hollow fiber membranes for pressure retarded (PRO) process with high power density, J. Membr. Sci. 389 (2012) 25-33.
[4] S. Zhang, F.J. Fu, T. S. Chung, Substrate modifications and alcohol treatment on thin film composite membranes for osmotic power, Chemical Engineering Science 87 (2013) 40-50.
[5] X. Li, S. Zhang, F.J. Fu, T.S. Chung, Deformation and reinforcement of thin-Film composite (TFC) polyamide-imide (PAI) membranes for osmotic power generation, J. Membr. Sci. DOI: 10. 1016/j.memsci.2013.01.049.
[6] G. Han, S. Zhang, X. Li, T.S. Chung, High performance thin film composite membranes: Break the bottleneck of power output to harvest renewable salinity-gradient energy via pressure retarded osmosis, J. Membr. Sci. 440 (2013) 108-121.

Notably, the transmembrane pressure resistance rates of hollow fibers L', MM', and N' (17.5, >20.0, and 20.0 bar, respectively) were closely related to those of their corresponding supports L, MM, and N (17.8, 22.0, and 21.0 bar, respectively, see Table 2, row 9), indicating the mechanical strength of a TFC hollow fiber is highly dependent on its support. Indeed, L', MM', and N' were all found to break slightly earlier than their corresponding supports L, MM, and N. MM' showed the highest transmembrane pressure resistance rate (>20 bar) among all three.

More importantly, the TFC hollow fibers prepared in Example 3 unexpectedly exhibited transmembrane pressure resistance rates that were much higher than those of any other membranes reported in the literature so far. See Table 4, column 3.

Hollow fibers L', MM', and N' were stabilized at their highest stable pressure for 30 min before their PRO performances were tested. In the study, 1 M NaCl, representing synthetic brine, was employed as the draw solution and DI water, representing river water, was used as the feed solution. In addition, synthetic feed solutions of 10 mM NaCl and 40 mM NaCl, to simulate river water and brackish water, respectively, were prepared and tested in the PRO process.

The flow rate for the draw solution and the feed solution were 0.2 and 0.15 L/min, respectively, and the operation was performed at room temperature (~23° C.).

Due to both a high water flux and a high mechanical strength, hollow fiber MM' showed the highest power density in a PRO process among all the three tested, having an unexpectedly high power density rate of 24.0 $Wm^{-2}$ at >20 bar when 10 mM NaCl was used as the feed solution. Its power density remained as high as 19.2 $Wm^{-2}$ when synthetic brackish water of a higher salinity, i.e., 40 mM NaCl, was employed as the feed solution.

Note that hollow fiber MM', regardless of which feed solution was used, unexpectedly exhibited a power density rate that was much higher than those of any other membranes reported in the literature. See Table 4, columns 5 and 6.

The results demonstrated that the TFC hollow fiber thus prepared are most suitable for PRO applications to exploit osmotic power.

Other Embodiments

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method of generating osmotic power comprising:
providing a thin film composite (TFC) hollow fiber including an outer support layer and an inner thin film layer,
wherein the outer support layer is formed of polyethersulfone and has a thickness of 10 to 10,000 μm, a sponge-like structure, an overall porosity of about 75%, a mean pore diameter within the range of about 8 nm to about 12 nm, and a geometric standard deviation of about 1.2,
the inner thin film layer is adherent to the outer support layer, is formed of cross-linked polyamide, and has a thickness of 1 to 10,000 nm, and
the hollow fiber has a transmembrane pressure resistance rate of about 20 bar or higher, a pure water permeability rate of about 3.3 $Lm^{-2}h^{-1}bar^{-1}$ or higher, and a salt permeability rate of about 0.4 $Lm^{-2}h^{-1}bar^{-1}$ or lower; and
subjecting the TFC hollow fiber to a pressure-retarded osmosis process by contacting the inner thin film layer with a pressurized draw solution and contacting the outer support layer with a feed solution so as to provide a power density rate of about 8 $Wm^{-2}$ or higher.

2. The method of claim 1, wherein the hollow fiber has a power density rate of higher than 20 $Wm^{-2}$.

3. The method of claim 2, wherein the outer support layer has a thickness of 100 to 300 μm and the inner thin film layer has a thickness of 50 to 500 nm.

4. The method of claim 1, wherein the outer support layer has a thickness of 50 to 1000 μm and the inner thin film layer has a thickness of 20 to 1000 nm.

5. The method of claim 4, wherein the outer support layer has a thickness of 100 to 300 μm and the inner thin film layer has a thickness of 50 to 500 nm.

* * * * *